United States Patent Office 3,050,490
Patented Aug. 21, 1962

3,050,490
BORON NITRIDE CONTAINING SELF-ADHERING SILICONE RUBBER
Siegfried Nitzsche and Manfred Wick, Burghausen, Germany, assignors to Wacker-Chemie G.m.b.H., Munich, Bavaria, Germany
No Drawing. Filed Feb. 5, 1960, Ser. No. 6,871
Claims priority, application Germany Feb. 20, 1959
7 Claims. (Cl. 260—37)

This invention relates to novel silicone rubber stocks which vulcanize to form self-adhering silicone elastomers.

The widespread use of silicone rubber in the form of tapes and sheets for wrapping electrical coils and electrical conductors generally and for a host of other uses requiring tapes or sheets of the rubber has resulted in an extensive search for adhesive and self adhering silicone rubber tapes. A silicone rubber tape which would adhere to silicone rubber, metal, plastics, wood, textiles, leather and other materials has obvious commercial value. The preparation of adherent silicone rubber tapes has heretofore employed several techniques including applying vulcanizable silicone rubber stocks to a suitable carrier or backing material such as glass cloth. Application of the stock was accomplished by rolling, brushing, immersing, calendering or other technique and the silicone rubber stock was partially vulcanized. The partial vulcanization could be accomplished by complete vulcanization of one side of the tape leaving the other side partially vulcanized and tacky. However, storage of such tapes resulted in rapid deterioration of the tacky characteristics. Furthermore, the use of glass cloth or other material as the carrier or base for the tape reduced the flexibility and stretchiness of the tape.

It was obvious to deposit a layer of tacky or sticky substance on one surface of a vulcanized silicone rubber tape and this has been tried with indifferent success. The adhesive layer does not adhere well to the vulcanized rubber and migrates during storage. Furthermore, when the tape is used the windings of tape cannot be applied with pressure or the adhesive may well be squeezed out of position thus leaving non-adherent spots in the winding.

Problems of storage, migration of adhesive, loss of adhesiveness, difficulty and expense of preparation, unsatisfactory performance and a host of other problems led to a continuation of the search for an adherent silicone rubber tape. A recent breakthrough on this problem was the discovery that a vulcanized silicone rubber containing from .015 to 5 percent by weight based on the weight of the silicone polymer present, of boron added as an alkyl borate exhibited self adherent properties (see U.S. patent application Serial No. 696,623, filed November 15, 1957, now abandoned).

This recent development of self adhering silicone rubber tapes was surprising in view of the fact that it was known to condense essentially diorganosiloxane polymers with alkyl borates or with boric acids. This condensation procedure has been employed to prepare "bouncing putty" which is a fluid material exhibiting rebound elasticity but devoid of cohesion when flexed and obviously not a true elastomer. The use of boric acid, boric acid anhydrides and alkyl borates in very small amounts to improve the handling properties of silicone rubber stocks is also known (see U.S. Patent No. 2,721,857). Thus the discovery of self adhering silicone rubber based on the addition of alkyl borates has been quite surprising.

However, certain problems in self-adhering silicone rubber remain unsolved. For example, a tape which can be vulcanized and stored in rolls without interleaving sheets and thereafter used has not been found. New tapes having adherent qualities based on materials other than alkyl borates have been sought. Commercially attractive silicone rubber tapes remain the goal of many researchers in the silicone rubber art.

It is an object of this invention to introduce a new silicone rubber exhibiting self adhesion. Another object is a commercial silicone rubber tape which becomes self-adhesive only when heated. Other objects include the avoidance of the many problems heretofore encountered with adhesive silicone rubber tapes. Other objects and advantages of this invention are detailed in or will be apparent from the disclosure and claims of this application.

This invention is a silicone rubber stock, vulcanizable to form self-adherent silicone rubber consisting essentially of a mixture of (1) a diorganosiloxane polymer, (2) boron nitride and, if desired, (3) a filler.

The diorganosiloxane polymers are well-known polymers upon which the silicone rubber art is based. These polymers vary from water-thin liquids to gums but a viscosity of at least 1000 cs. at 25° C. is preferred. The diorganosiloxane polymers are essentially linear polymers of $R_2SiO$ units where each R is a monovalent hydrocarbon radical or a halogenated monovalent hydrocarbon radical. The operative polymers can contain up to 2 mol percent, preferably below .1 mol percent, of $RSiO_{3/2}$, $R_2R'SiO_{1/2}$ and/or $SiO_{4/2}$ units. In all of these units, each R can be any alkyl radical such as methyl, butyl and octadecyl; any aryl radical such as phenyl and anthracyl; any alkenyl radical such as vinyl, allyl and octadecenyl; any alkaryl radical such as tolyl and xylyl; any aralkyl radical such as benzyl and phenylethyl; or any cycloaliphatic radical such as cyclopropyl, cyclobutyl and cyclopentyl; or any halogenated derivative of the foregoing radicals, such as haloalkyl including chloromethyl, perfluoroethyl and 3,3,3-trifluoropropyl; haloaryl such as chlorophenyl and iodoanthracyl; haloalkenyl such as chlorodifluorovinyl and bromoallyl; haloalkaryl such as α,α,α-trifluorotolyl; haloaralkyl such as bromobenzyl; and halocycloaliphatic such as chlorocyclopropyl. In the endblocking units, designated as $R_2R'SiO_{1/2}$, the R' can represent H, OH, OR or R. In these siloxane polymers, at least 50 percent of the organic substituents represented by R should be methyl radicals.

Suitable fillers for the compositions of this invention include $TiO_2$, zinc oxide, silicas such as diatomaceous earth, silica aerogels, silica xerogels, fume silica, carbon blacks, argillaceous earth, glass fibers, glass powder, clay, iron oxide, cork, organic resins, polytetrafluoroethylene, polychlorotrifluoroethylene, and copper phthalocyanine. These fillers, and particularly the silicas and carbon blacks, can be modified with organosilicon compounds and can have organosilyl groups attached through Si—O bonds to the surface thereof. The fillers are employed in widely varying proportions, preferably from 20 to 200 parts by weight filler per 100 parts by weight diorganosiloxane polymer.

The compositions of this invention can be vulcanized by any desired means. The most commonly employed vulcanization system for silicone rubber stocks comprises admixing .1 to 10 parts by weight, preferably .5 to 5 parts by weight of an organic peroxide per 100 parts diorganosiloxane polymer with the stock and heating the resulting mixture to activate the peroxide and effect the desired vulcanization. Operable heat vulcanizing agents include benzoyl peroxide, dichlorobenzoyl peroxide, di-tertiary butyl peroxide, dicumyl peroxide, tertiary butyl perbenzoate and so forth. Vulcanization can also be obtained employing high energy radiation with a Van de Graaff particle accelerator, a Co-60 source, certain X-rays, and so forth.

A further vulcanization system which can be employed when the diorganosiloxane polymer is hydroxy or alkoxy endblocked involves adding to the silicone rubber stocks .05 to 10 parts by weight of a cross linking agent selected from alkyl silicates, alkyl polysilicates and methylhydrogensiloxanes and as a catalyst .01 to 5 parts by weight of a metal salt of a carboxylic acid such as lead octoate, dibutyl tin dilaurate, stannous octoate, zinc naphthenate, iron naphthenate or other such salts as disclosed and claimed in U.S. patent application Serial No. 602,081, filed August 3, 1956. This system provides room temperature vulcanizing silicone rubber stocks.

Other additives which can be incorporated into the compositions of this invention include pigments, compression set additives, oxidation inhibitors and other materials commonly employed as additives in the silicone rubber art. Such additives are preferably present in minor amounts below 5 percent by weight of the mixture.

The boron nitride employed in the compositions of this invention is a well-known boron compound prepared by known means such as by the reaction of borax with ammonium chloride. The boron nitride is employed in proportions of from 10 to 100 parts by weight BN to 100 parts by weight diorganosiloxane polymer. The degree of self adhesion of the vulcanized silicone rubber can be adjusted by controlling the proportion of boron nitride present. When from about 10 to about 35 parts by weight of boron nitride is employed per 100 parts diorganosiloxane polymer, it is generally necessary to heat the tape to secure the desired self-adhesion. When the proportion of boron nitride exceeds 35 parts per 100 parts polymer in the silicone rubber, the tape will be self adhering at room temperature or at only moderately advanced temperatures up to about 50° C.

The diorganosiloxane polymer, filler and boron nitride are mixed in any desired manner. In general, two- and three-roll mills and commercial mixers are employed to accomplish the desired mixing. The vulcanizing agent can be added during mixing provided it is not activated at room temperature. When one of the room temperature vulcanizing systems is employed, the cross linking agent and catalyst are added at the time the material is to be employed.

The mixture of polymer, boron nitride, filler and any other additives can be molded, shaped, extruded or pressed in any desired shape. Generally sheets or tapes are prepared and vulcanized in accordance with the vulcanization system employed.

The compositions of this invention are useful for all the many applications known for self-adhering silicone rubber such as electrical insulating, joint sealants, packing rings, laminating materials, and so forth. Better adhesion between boron-free organosiloxane elastomers and metal can be accomplished employing the self-adhering rubber of this invention as an interlayer and bonding agent. A good bond at low pressure is obtained by priming metal with ethylpolysilicate, applying thereto a layer of the self-adhering rubber of this invention and then applying the desired silicone elastomer on the layer of self-adhering rubber. The resulting bond displays outstanding mechanical strength.

Another unusual use for the self adhering silicone rubber of this invention involves repairing damaged silicone rubber pieces. For example, silicone rubber insulated cable may be abraded, cut, burned or otherwise damaged. It has been found the damage may be repaired by applying a coating, a layer of the appropriate amount and shape of the self-adhering silicone rubber of this invention, thus healing the damage. The silicone rubber so applied will adhere to and form a unitary mass with the rubber already present at the site. Furthermore, it is possible to splice silicone rubber insulated cable and cover the area of the splice with the self-adhering silicone rubber of this invention thus obtaining a continuous silicone rubber insulated conductor. The self-adhering silicone rubber serves to bond together separate layers or adjoining masses of boron-free silicone rubber.

The following examples are included to aid in understanding and practicing this invention. The scope of the invention is delineated in the claims and is not limited by the examples. All parts and percentages in the examples are based on weight and all viscosities were taken at 25° C. unless otherwise stated. The symbols Me, Ph, Et and Vi represent respectively methyl, phenyl, ethyl and vinyl.

*Example 1*

A mixture was prepared on a three roll mill from 100 parts hydroxy endblocked polymeric dimethylsiloxane gum, 40 parts boron nitride and 5 parts tertiary butyl perbenzoate. The mixture was sheeted in a 1 mm. thick sheet and vulcanized in a press at 150° C. for 10 minutes. The resulting rubber sheet was self adhering. The sheet was wound around a metal mandrel which had been lightly lubricated with vaseline. The resulting silicone rubber tube was removed from the mandrel and cured for 5 hours at 150° C. to form a homogeneous, unitary tube.

*Example 2*

A mixture was prepared on a three roll mill from 100 parts hydroxy endblocked polymeric dimethylsiloxane gum, 20 parts quartz flour, and 50 parts boron nitride. This material was then mixed with 2 parts of an equimolar mixture of lead octoate and hexaethoxydisiloxane and drawn into a sheet 4 mm. thick. The sheet vulcanized at room temperature in 4 hours. Packing rings cut from the sheet adhered to metal packing seats by mere manual pressure.

*Example 3*

When Example 1 was repeated employing a trimethylsilyl endblocked copolymer of 99.6 mol percent dimethylsiloxane and .4 mol percent methylvinylsiloxane having a viscosity of 50,000 cs.; a hydroxy endblocked copolymer of 80 mol percent dimethylsiloxane, 15 mol percent methylphenylsiloxane and 5 mol percent diphenylsiloxane units having a viscosity of 500,000 cs.; or a hydrogen endblocked copolymer of 50 mol percent dimethylsiloxane, 40 mol percent methylethylsiloxane, 9 mol percent phenylmethylsiloxane, .5 mol percent methylvinylsiloxane and .5 mol percent phenylvinylsiloxane units having a viscosity of 25,000 cs., the resulting product was a self adherent silicone rubber.

*Example 4*

When Example 1 was repeated employing 90 parts boron nitride, a readily self-adherent silicone rubber was obtained.

*Example 5*

When Example 1 was repeated employing 40 parts of a fume silica as filler and 2 parts 2,4-dichlorobenzoyl peroxide as vulcanizing agent, a self-adhering silicone rubber was obtained.

*Example 6*

When a mixture of 100 parts hydroxy endblocked dimethylsiloxane polymer of about 1,000,000 cs. viscosity, 20 parts silica aerogel as filler, 50 parts boron nitride, 5 parts methylhydrogensiloxane polymer of 50 cs. viscosity and 1 part dibutyl tin dilaurate was extruded into a tape 2 mm. thick, a self-adhering, vulcanized silicone rubber tape resulted after standing 4 hours at room temperature.

That which is claimed is:

1. A composition of matter consisting essentially of a mixture of (a) 100 parts by weight of an essentially linear diorganosiloxane polymer of at least 1,000 cs. viscosity at 25° C., the organic substituents being selected from the group consisting of monovalent hydrocarbon radicals and halogenated monovalent hydrocarbon radicals, at least 50 percent of the organic substituents being methyl radicals and (b) 10 to 100 parts by weight of boron nitride.

2. A composition of matter in accordance with claim 1 further characterized in that the mixture contains (c) 20 to 200 parts by weight of filler.

3. A composition of matter in accordance with claim 2 further characterized in that the mixture contains as a vulcanizing agent (d) .5 to 5 parts by weight of organic peroxide.

4. A composition of matter in accordance with claim 2 further characterized in that the mixture contains as a vulcanizing system (d) a mixture of .05 to 10 parts by weight of a cross linking agent selected from the group consisting of alkyl silicates, alkyl polysilicates, and methylhydrogensiloxane and .01 to 5 parts by weight of a metallic salt of an organic monocarboxylic acid capable of curing the convertible organopolysiloxane.

5. A composition in accordance with claim 3 wherein the diorganosiloxane polymer is a dimethylsiloxane polymer.

6. A composition in accordance with claim 4 wherein the diorganosiloxane polymer is a dimethylsiloxane polymer.

7. A self-adhering silicone rubber prepared by heating the mixture of claim 3 to above the decomposition temperature of the organic peroxide.

References Cited in the file of this patent
UNITED STATES PATENTS

| | | |
|---|---|---|
| 2,748,030 | Silversher et al. | May 29, 1956 |
| 2,843,555 | Berridge | July 15, 1958 |
| 2,927,907 | Polmanteer | Mar. 8, 1960 |